United States Patent [19]
Lee et al.

[11] Patent Number: 4,513,831
[45] Date of Patent: * Apr. 30, 1985

[54] WEIGHING SYSTEM

[75] Inventors: Shih-Ying Lee, Lincoln; Dennis K. Briefer, Berlin, both of Mass.

[73] Assignee: Setra Systems, Inc., Acton, Mass.

[*] Notice: The portion of the term of this patent subsequent to May 10, 2000 has been disclaimed.

[21] Appl. No.: 492,942

[22] Filed: May 9, 1983

Related U.S. Application Data

[63] Continuation-in-part of Ser. No. 265,088, May 19, 1981, Pat. No. 4,382,479.

[51] Int. Cl.³ ............... G01G 23/06; G01G 21/10; G01G 3/14; G01G 3/08
[52] U.S. Cl. .................... 177/189; 177/184; 177/210 C; 177/229
[58] Field of Search ........... 177/187, 189, 210 EM, 177/210 C, 210 FP, 229, 255, 184

[56] References Cited

U.S. PATENT DOCUMENTS 3,991,841  11/1976  Crawley ................. 177/184 X
4,170,270  10/1979  Sette et al. ............. 177/184
4,382,479   5/1983  Lee et al. .............. 177/189

FOREIGN PATENT DOCUMENTS 2383437  11/1978  France ................... 177/189

Primary Examiner—Harold Broome
Assistant Examiner—Patrick W. Foster
Attorney, Agent, or Firm—Kenway & Jenney

[57] ABSTRACT

A weighing system includes a weighing pan connected to a rigid armature by a mechanical filter constraining the armature to motion along a reference axis with respect to a housing and damping out transient forces along this axis resulting from the placement of objects on the pan. The mechanical filter includes spring and damping elements that provide a low-pass filter, that is, one that efficiently and quickly eliminates high frequency oscillations. In one form, the mechanical filter couples the pan to the armature. Because of this connection, friction in the mechanical filter does not result in frictional errors in the weighing measurement. In another form, a mechanical linkage couples the armature to the housing. A force transducer, comprising a pair of complementary opposed surfaces having a mutual separation which is related to the force across the transducer, is coupled between the armature and the housing. Coupled to the transducer is a position sensor which generates a signal representative of the separation between the complementary opposed surfaces of the transducer.

19 Claims, 12 Drawing Figures

WEIGHING SYSTEM

REFERENCE TO RELATED APPLICATIONS

This application is a continuation-in-part of U.S. patent application Ser. No. 265,088 filed on May 19, 1981, now U.S. Pat. No. 4,382,479, issued May 10, 1983. The subject matter of this application is related to the subject matter of U.S. patent application Ser. No. 265,087, Force Transducer, Ser. No. 265,089, Adjustable Linkage, Ser. No. 265,086, Temperature Compensated Measuring System, Ser. No. 265,090, Inductive Circuit Element, Ser. No. 265,092, Linear Motion Linkage, all filed on May 19, 1981, and Force Transducer, Ser. No. 359,619, filed on Mar. 18, 1982. Those applications are incorporated herein by reference.

BACKGROUND OF THE INVENTION

The present invention is in the field of instrumentation, and more particularly, relates to weight measuring apparatus.

A typical prior art weighing system includes a platform, or weighing pan, for receiving the weight to be measured. The weighing pan is coupled by a force transducer to a support member, or frame. In various forms of the prior art, the transducer and weighing pan are coupled to the support member by linkages adapted to permit relatively accurate weighing of objects placed in the pan. By way of example, the force sensors might incorporate strain gauges, or a movable coil in a fixed magnetic field in a feedback arrangement.

While prior art weighing systems do provide a relatively accurate measure the weight of objects placed in the weighing pan, they have a number of shortcomings. For example, many such systems are particularly sensitive to off-center loading of the object-to-be-measured in the weighing pan. Such off-center loading may give rise to errors due to frictional losses in the system. To counteract such losses, the prior art scale systems often utilize various forms of mechanical linkages for reducing such errors. For example, U.S. Pat. No. 4,026,416 discloses a flexure arrangement restricting motion of the weighing pan along a single sensing axis. However, such systems are relatively limited in their range of motion and thus in the range of weights permitted.

A further disadvantage of many of the prior art systems, is variation of the indicated weight of a given object with temperature, such as may be due to the temperature effects on the sensing transducer and associated circuitry.

Accordingly, it is an object of the present invention to provide a high accuracy and high precision weighing system.

It is another object to provide a weighing system which is compensated for variations in temperature of the system.

SUMMARY OF THE INVENTION

Briefly, the present invention is a weighing system which includes a force input member, such as a weighing pan and rigid armature. A first linkage couples the armature to a reference member, or housing, in a manner constraining the armature to motion along a reference axis fixed with respect to the reference member. In general, this linkage is particularly resistant to applied moments.

A force transducer is coupled between the armature and reference member. The transducer includes a pair of complementary opposed surfaces having a mutual separation which is related to the force across the transducer.

A position sensor coupled to the transducer generates a signal representative of the separation between the complementary opposed surfaces of the transducer.

A preferred embodiment of the further invention of this application employs a mechanical filter "series-coupled" between the weighing pan and the rigid armature. The filter includes spring and damping elements which together form a low-pass filter that effectively attenuates oscillations resulting from the placement of objects in the pan or from vibrations transferred from the surface on which the scale is placed, while at the same time transmitting to the armature steady-state and low frequency forces applied to the force input member. Because of this connection, frictional losses in the mechanical filter do not produce errors in the weighing measurement. In a preferred form this "series-coupled" mechanical filter includes a parallelogram structure having a pair of rigid side members bridged by a pair of resilient members. These component members are secured to one another without hinge couplings to generate a spring action. A pair of resilient arms are mounted within this parallelogram structure and extend towards one another in a mutually spaced relationship generally along a diagonal to the parallelogram. A resilient material, preferably a "lossy" one with a large energy absorption upon deformation, is located between the diagonally projecting arms to provide a damper.

In another "series-coupled" form, a damper is coupled between the weighing pan and the armature. A second linkage resiliently couples the weighing pan to the armature, permitting a relatively large range of linear relative motion of those elements.

In yet another "series-coupled" form, the mechanical filter can be located directly between the pan and a rigid support member coupled to the armature. In this form, the spring-like response of the mechanical filter can be generated by a set of resilient, soft elastic supports that rest on the support member and support the pan. Damping is provided by an elastomer tube that acts as a resilient seal spanning the support-pan gap to create an enclosed air volume. A small orifice in the support member produces the desired damping. In this form, the elastomer tube also contributes to the spring action. In still another related form, the pan has a downwardly descending skirt portion that is closely spaced from the edge of the support member. This annular gap acts in the same manner as the small orifice. In either of these forms, a portion of the housing adjacent the force input member can act as a stop member to limit the maximum vertical displacement of the weighing pan.

In yet another form of this invention, the coupling between the weighing pan and the armature is substantially rigid. In this form, digital signal processing of the output signal of the position sensor is preferably used to remove the effects of high frequency oscillations.

BRIEF DESCRIPTION OF THE DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENT

Figure 1:
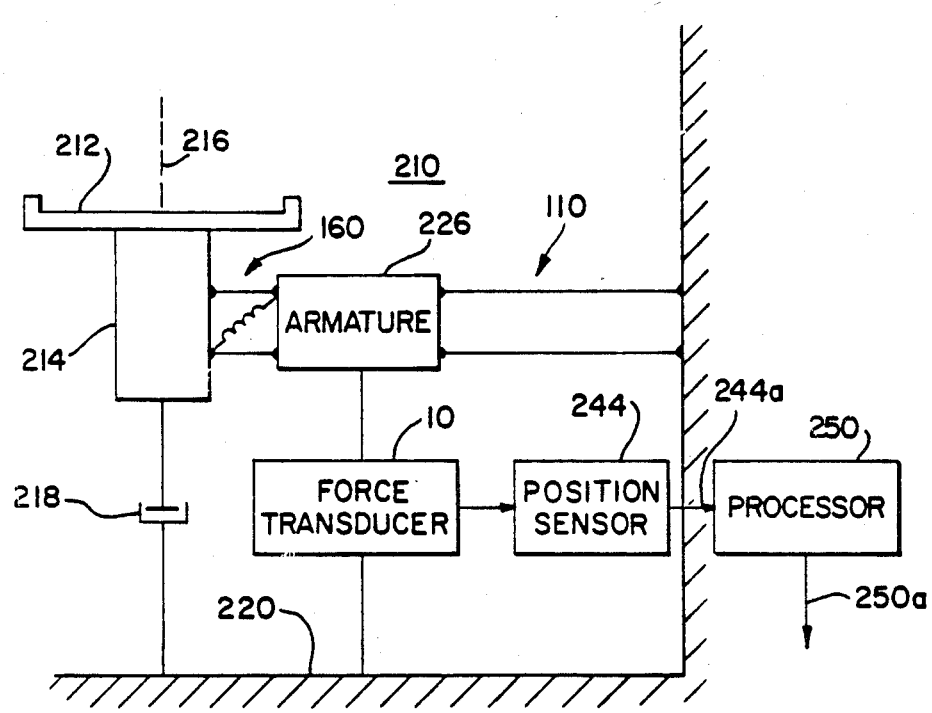
FIG. 1 shows in schematic form, an exemplary embodiment of the present invention employing "parallel" damping.
Figure 8:
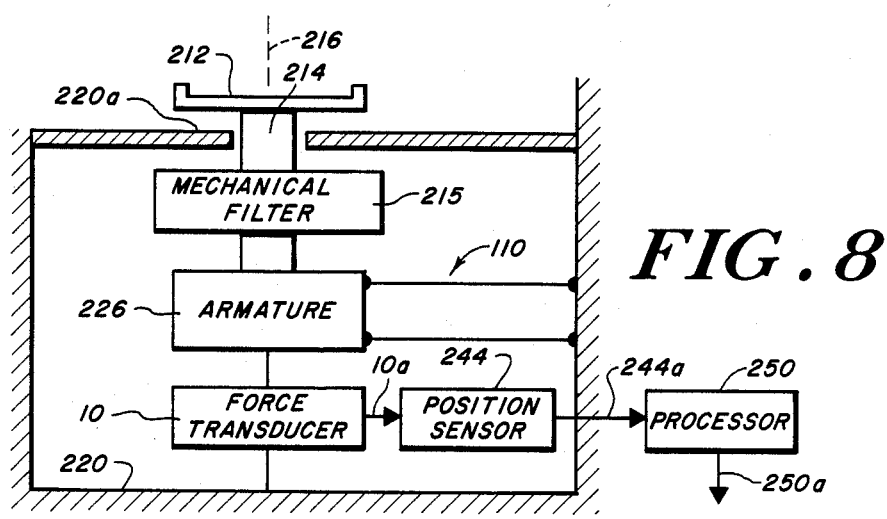
FIG. 8 shows in schematic form an alternative embodiment of the further invention employing "serial" mechanical filtering.
Figure 9:
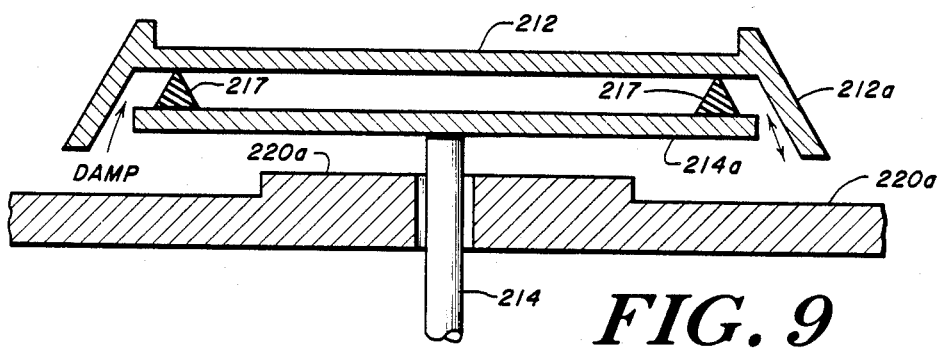
FIG. 9 shows a section of an embodiment of the serial mechanical filter of FIG. 7.
Figure 10:
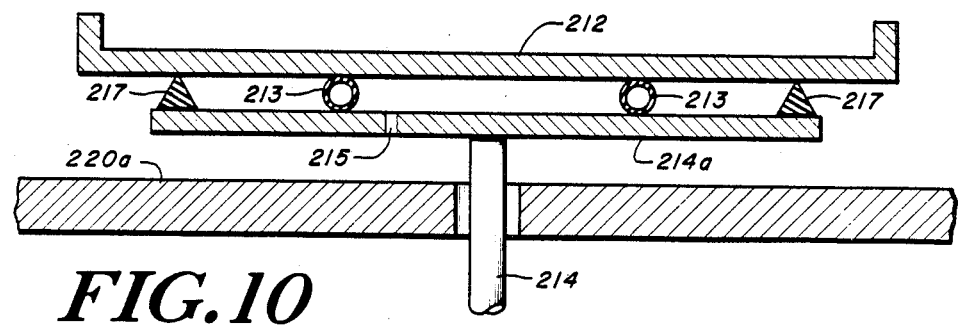
FIG. 10 shows a section of an alternative embodiment of the serial mechanical filter of FIG. 7.
Figure 11:
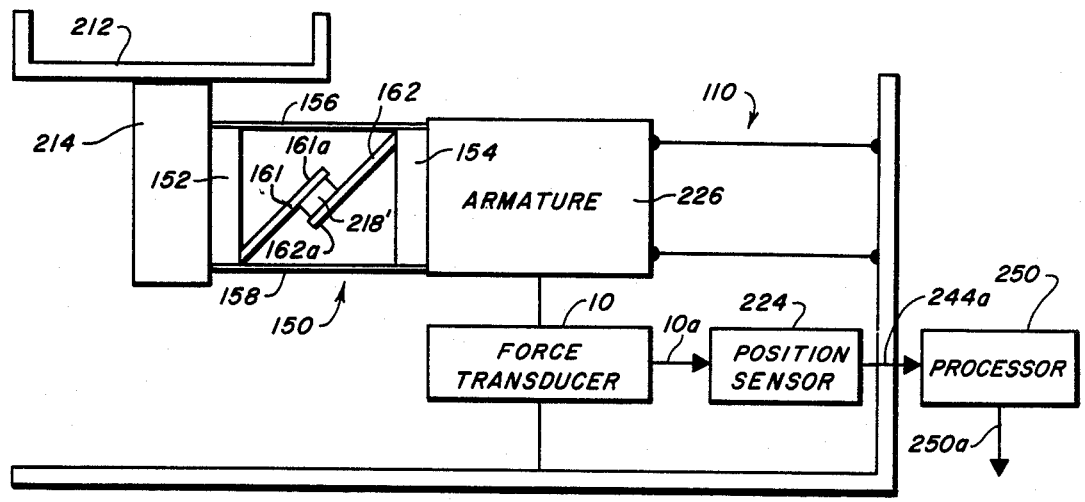
FIG. 11 shows in schematic form a preferred embodiment of the further invention of this application employing "serial" mechanical filtering.

FIG. 1 shows a schematic representation of one embodiment of a weighing system 210 in accordance with the present invention, more specifically, one employing "parallel" damping as described in the parent application, U.S. Ser. No. 265,088, filed May 19, 1981, now U.S. Pat. No. 4,382,479. It includes a weighing pan 212 and associated support post 214 adapted for motion along a reference axis 216. In other embodiments, the "pan" may be replaced by some other type of force member. In this FIG. 1 embodiment, the post 214 is coupled by way of a mechanical damper assembly 218 to a reference member (or housing) 220 which is fixed with respect to axis 216. The pan 212 and its support post 214 are coupled to an armature member 226 by a parallel motion linkage assembly 160. In another embodiment shown in FIG. 7 incorporating the further invention of this application, the post 214 is "serial"-coupled to the armature member 226 by way of a mechanical damper assembly 218. A schematic representation of another embodiment of a scale 210 in accordance with the further invention employing a generalized "serial" mechanical filter is shown in FIG. 8. FIGS. 9 and 10 show alternative embodiments of the "serial" mechanical filter of FIG. 8. FIG. 11 shows a preferred form of the "serial" mechanical filter of FIG. 8.

In any of the embodiments of FIGS. 1, 7, 8, or 11 the armature member 226 is coupled by a parallel motion linkage assembly 110 to the reference member 220. A force transducer 10 is coupled between the armature member 226 and the reference member 220. The transducer 10 is coupled by the line 10a to a motion sensor 244. Position sensor 244 in turn provides an output signal on line 244a which is representative of the motion of an element of the force transducer 10 which is due to displacement of pan 212 by the weight to be measured in that pan.

A processor 250 is responsive to the signal on line 244a to provide an output signal on line 250a. The latter signal is representative of the weight of the object on the weighing pan 212.

Figure 2:
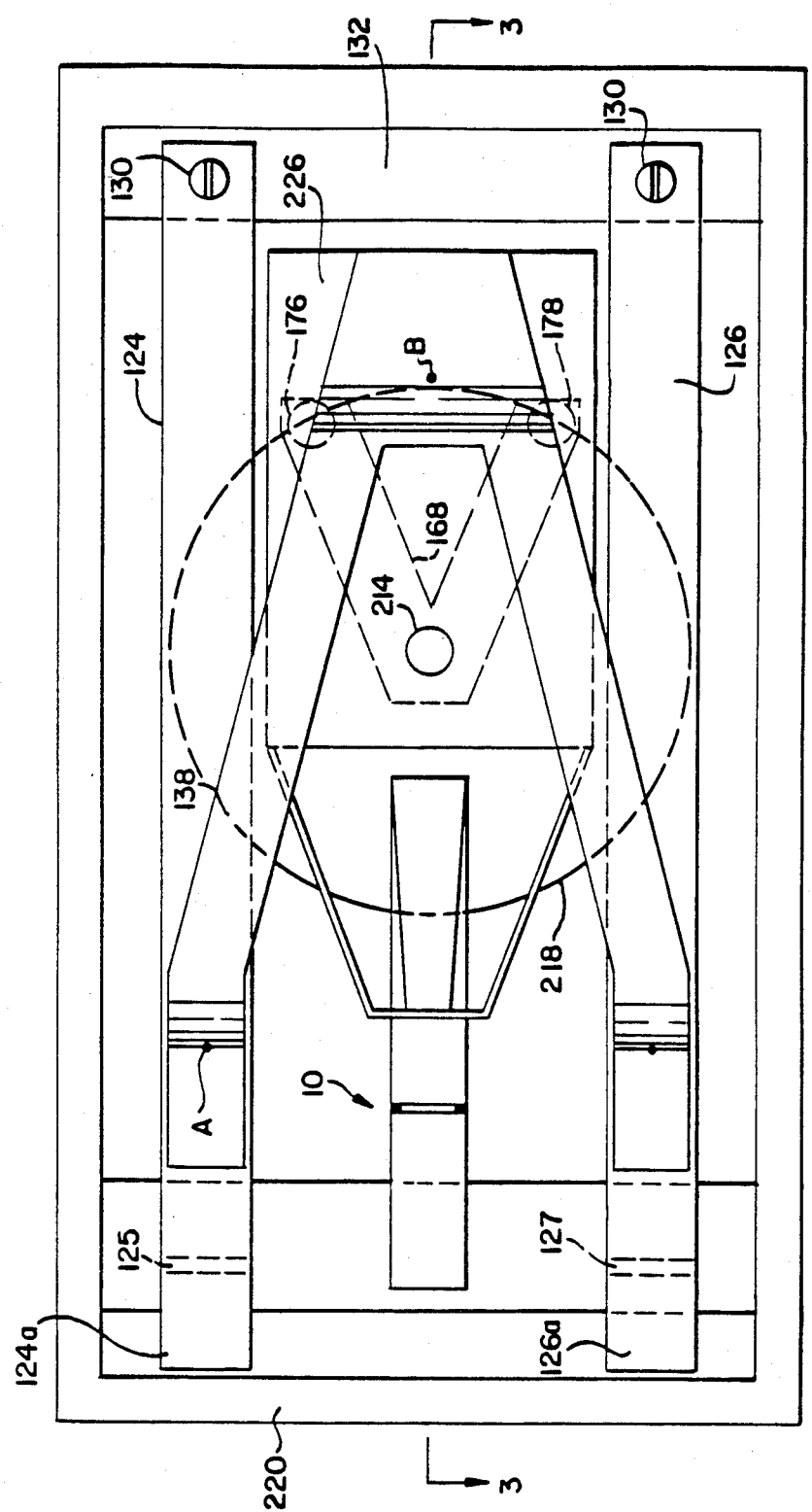
FIG. 2 shows a top elevation of an exemplary embodiment of the system of FIG. 1.
Figure 3:
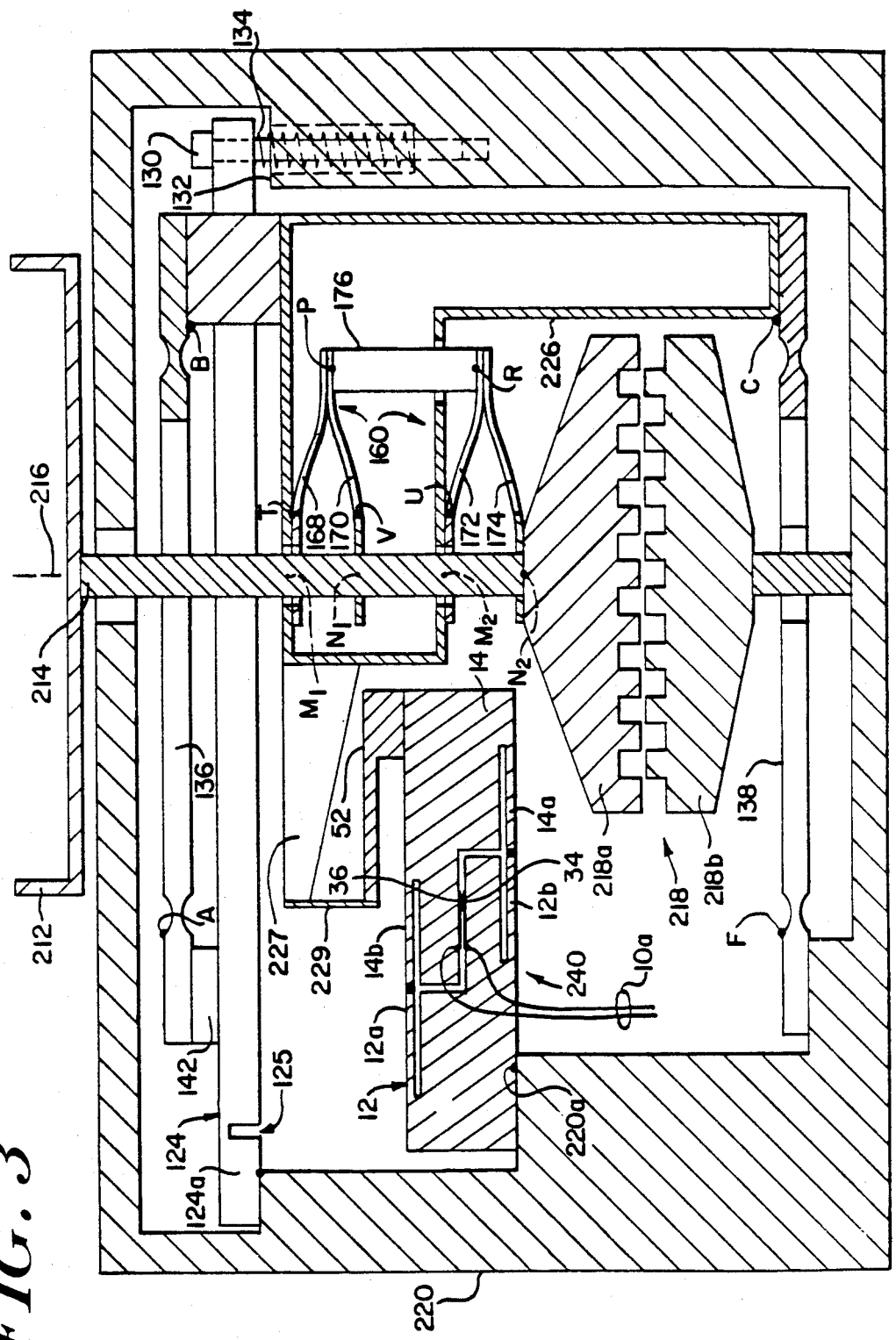
FIG. 3 shows a section of the embodiment of FIG. 2.

FIG. 2 shows a top view (without pan 212) and FIG. 3 shows a sectional view, respectively, of an exemplary form of the weighing system of FIG. 1.

The various elements of the system will now be described.

WEIGHING PAN 212 AND SUPPORTING POST 214

The weighing pan 212 in all of the illustrated embodiments is a platform adapted to receive an object to be weighed by scale 210. A circular cylindrical support post 214 extends from the bottom of pan 212. This post 214 is generally constrained to near-frictionless damped motion along axis 216 by the portions of system 210 described below.

DAMPER 218

Any of a wide variety of damping means can be employed to constrain and damp the vertical movement of post 214. In the embodiment shown in FIG. 1, damper 218 is "parallel"-coupled between support post 214 and support member 220. One embodiment of this "parallel"-type damper employs a pair of generally circular elements 218a and 218b as shown in FIGS. 2 and 3. The opposing portions of elements 218a and 218b each include a set of concentric circular ridges. The ridges from element 218a are adapted to inter-mesh with the ridges of element 218b with the relative motion of those elements along axis 216, in a manner that the air displaced between the ridges provides a low-friction damping of the relative motion of elements 218a and 218b. The maximum downward displacement of the weighing pan 212 is limited to the depth of the ridges of elements 218a and 218b.

Figure 7:
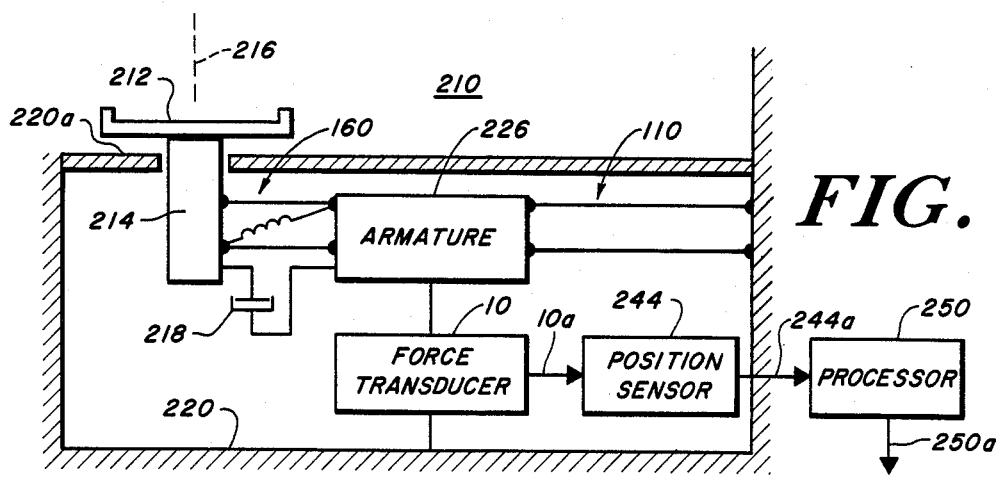
FIG. 7 shows in schematic form an embodiment of the further invention of this application employing "serial" mechanical filtering.

In another embodiment of the further invention shown in FIG. 7, the damper 218 is "serially"-coupled between the support post 214 and the armature 226. This coupling has the advantage that frictional losses in the damper do not contribute errors in the measured weight as they can if the damper is parallel connected between the force input member and the housing. This placement of damper 218 can be accomplished by attaching element 218b to the bottom of armature 226 at V-shaped element 138 (FIGS. 2 and 3) of the linkage assembly 110 rather than to housing 220 as shown in FIGS. 2 and 3.

Figure 12:
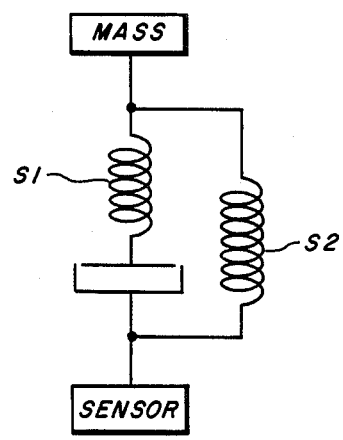
FIG. 12 shows in schematic form a mechanical analog of the serial mechanical filter of FIG. 11.

FIG. 11 shows a preferred form of the serial mechanical filter of the further invention and FIG. 12 shows, in schematic form, a simplified mechanical analog circuit. In this FIG. 11 embodiment, the function of the parallel motion linkage 160 of the FIG. 7 embodiment and the displaced air damper 218, is replaced by a parallelogram structure 150 having a pair of generally parallel, rigid "vertical" members 152 and 154 linked by a pair of generally parallel, resilient spring members 156 and 158. These parallelogram members are secured to one another at their adjoining ends so that a generally vertical displacement of one of the vertical members 152 or 154 with respect to the other such member, in response to the force of an object to be weighed, is resisted by the spring force generated by an S-shaped deflection of the members 156 and 158. This parallelogram structure provides a guided motion of the vertical side member 152 generally along the vertical reference axis 216. The members 152, 154, 156 and 158 are also sufficiently wide in a direction normal to the plane of FIG. 11 to resist moments other than those directed along the reference axis 216. While the parallelogram structure 150 as shown includes the pair of vertical members so that the structure 150 is a self-contained flexure, it will be understood that the equivalent function can be achieved by securing the spring members 156 and 158 directly to the support post 214 and the armature 226.

The parallelogram structure 150 includes a pair of arms 161,162 that are each secured to one of the vertical members. The arms 161,162 can be rigid, but are preferably flexible in a bending mode while being fairly rigid in a tension-compression mode along their own axes. They extend toward one another in a parallel spaced relationship, preferably along a diagonal of the parallelogram structure. The free ends 161a and 162a of the arms 161,162 overlap one another. A piece of energy absorbing ("lossy") resilient material 218' is secured between the ends 161a and 162a. The material 218' acts as a damper to attenuate oscillations produced by an object being placed on the pan 212 or by external oscillations in the surface on which the weighing system 210 is located. A flexure of the parallelogram structure produces primarily a shearing motion in the material 218', although there will also be a tension or thickness reduction mode. In contrast, if the arms are perfectly rigid and hinged at their anchor points, a deformation of the flexure will result in only a shearing of the material 218'. It should be noted that the arms 161,162 and the material 218' provide some resilience to the parallelogram structure 150. It should also be noted that the location of the arms 161,162 is not critical. They can, for example, be connected to the vertical members at a point spaced from the corners adjacent the members 156 and 158, or connected to the flexible members themselves.

FIG. 12 is a mechanical analog of the damped parallelogram structure shown in FIG. 11. As shown, the arrangement is essentially a damped spring-mass system with the material 218', located in series with a spring $S_1$ and a mass, providing the damping and some degree of resilience. It is significant, however, that this system includes a spring element that is connected in parallel with the damper, as represented by spring $S_2$. The spring $S_1$ is important in attentuating high frequency oscillations since the damper at high frequencies responds as though it were a rigid connection. A simple damped spring-mass system will usually not attenuate these high frequencies effectively since they are usually far from the resonant frequency of the system.

Another significant advantage of the 150 damped parallelogram structure is that it provides a serial mechanical filtering and coupling between the force input member and the armature using a construction that is readily manufactured from ordinary materials. For example, the members 156, 158, 161 and 162 can be formed from spring steel. In particular, it avoids using the comparatively complex flexure 160 and the displaced air damper 218. It should be noted that the members 156 and 158 can be substantially rigid. This arrangement provides no resilience or damping and therefore provides no mechanical filtering. However, the weighing system is nevertheless operable, with signal processing described below. Mechanically this is equivalent to, and it is, of course, possible to provide a direct, rigid coupling between the weighing pan and the force transducer.

Another embodiment of a simple, inexpensive "series"-type damper is shown in FIG. 10 where the support post 214 mounts a generally circular support member 214a and a generally circular hollow resilient tube 213 is deployed between the underside of pan 212 and the top surface of member 214a. (In this embodiment, as well as those shown in FIGS. 7, 8 and 9, housing 220 has a portion 220a that extends under the weighing pan 212 and is normally spaced slightly below the bottom surface of the pan as shown. Additionally, in the embodiment of FIG. 9, housing portion 220a consists of a raised portion of housing 220.) With this construction, the housing portion 220a acts as a stop member that limits the maximum downward vertical displacement of the pan. If the initial instantaneous applied forces are large, stop member 220a limits the maximum amplitude of the oscillations and thereby assists the damper 218 in quickly bringing the force input member to a rest position. It should be noted that the housing portion 220a is also spaced from the support post 214 so that there is no frictional loss at this interface.

As shown in FIG. 10, located within the circumference of tube 213 is orifice 215 which permits an inflow and outflow of the air entrapped between the pan, the member 214a, and the tube, when an object is placed on the pan to be weighed. The amount of damping provided by this arrangement is determined by the amount of air displaced per unit time and therefore ultimately of the size of the orifice. A number of resilient support members 217 deployed between pan 212 and the top of member 214a serve to support the pan, act as spring-elements, and, at the limits of their compression act in conjunction with housing portion 220a, as stop members to limit the downward displacement of the pan.

An alternative embodiment of this air-spring style, series-type damper is shown in FIG. 9 where a generally circular pan 212 has a downwardly descending skirt 212a. Support post 214 is provided with a generally circular member 214a mounted horizontally at its upper end and having a diameter chosen so that the gap between member 214a and the skirt 212a serves as an orifice to permit the outflow of the air entrapped between the platform, the underside of the pan and the skirt. This annular orifice acts in the same manner as the orifice 215 in the FIG. 10 embodiment. Similarly, a number of resilient support members 217 deployed between the pan and the support member 214a serve as spring-like pan supports and as stop members.

ARMATURE 226 AND LINKAGE 160

In the embodiments of FIGS. 1 and 7, the support post 214 is coupled to an armature 226 by way of a linkage 160. Linkage 160 is a linkage which constrains the motion of a reference member (corresponding to support post 214) to be along a reference axis (corresponding to axis 216) which has a substantially fixed orientation with respect to the armature 226. The "parallelogram" motion of the linkage 160 is desirable to maintain the pan in a level orientation, however, this action is not essential.

In the embodiment illustrated in FIGS. 2 and 3, armature 226 has the form of a closed sheet metal box. The linkage 160 generally has the form shown in the incorporated reference U.S. patent application Ser. No. 265,092 (SET-120). FIG. 1 of that application shows the linkage 160.

As shown there, linkage 160 is shown which is adapted for constraining the motion of a reference member 162 (corresponding to post 214) to be along a reference axis 164 (corresponding to axis 216) which is fixed with respect to a support member 166 (corresponding to armature 226). The linkage 160 includes two pairs of V-shaped elastic flexure elements. The first (or upper) pair includes elements 168 and 170 and the second pair (or lower) includes elements 172 and 174. Each of elements 168, 170, 172 and 174 has a vertex end portion and first and second distal end portions.

In the present embodiment, the first distal end portions of the upper pair of flexure elements (elements 168 and 170) are coupled to each other, and the second distal end portions of the upper pair are coupled to each other. Similarly, the first distal end portions of the lower pair of flexure elements (elements 172 and 174) are coupled to each other and the second distal end portions of the lower pair are coupled to each other.

The first distal end portions of the upper pair of flexure elements are also coupled to the corresponding first distal end portions of the lower pair of flexure elements by a rigid coupling member 176 having length L in the direction of axis 216. Similarly, the coupled second distal end portions of the upper pair of flexure elements are also coupled to the second distal end portions of the lower pair of flexure elements by a rigid coupling member 178 having length L in the direction of axis 216.

The vertex portion of the upper flexure element 168 of the upper pair is coupled to the support member 166 (i.e. armature 226) at a point M1. Similarly, the vertex portion of the upper element 172 of the lower pair is coupled to the support member 166 (i.e. armature 226) at a point M2, where points M1 and M2 are separated by a distance L in the direction of axis 164 (i.e. axis 216).

The vertex portion of the lower flexure element in the upper pair is coupled to the reference member 162 (i.e. post 214) at a point N1. Similarly, the vertex portion of the lower element 174 of the lower pair is coupled to the reference member 162 (i.e. post 214) at point N2.

In the present embodiment, the extensions of the vertex portions beyond respective points T, U, V, and W act substantially as rigid couplings to the respective ones of post 214 and armature 226. Consequently, the distance between points M1 and M2 (M1M2) substantially equals the distance between points T and U (TU) and the distance between points N1 and N2 (N1N2) substantially equals the distance between points V and W (VW), where all of those distances M1M2, TU, N1N2 and VW refer to distances in the direction of axis 216. As a result, all of the distances QS, PR, VW and TU are equal to L.

In addition, point S is equidistant on the surface of said flexure elements 172 and 174 from points W and U (i.e. SW=SU), point R is equidistant on the surface of said flexure elements 172 and 174 from points W and U (i.e. RW=RU), point Q is equidistant on the surface of said flexure elements 168 and 170 from points T and V (i.e. VQ=TQ), and point P is equidistant on the surface of said flexure elements 168 and 170 from points T and V (i.e. VP=TP).

With this configuration and in conjunction with damper 218, whether series or parallel coupled, the reference member 162 (corresponding to the post 214 in FIGS. 2 and 3) is constrained to relatively large, damped motions substantially along the axis 164 (corresponding to axis 216 in FIGS. 2 and 3) which is fixed with respect to the support member 166 (corresponding to FIGS. 2 and 3). Such motions may be in response to forces resulting from objects in pan 212.

LINKAGE 110

The armature 226 is also coupled to the support member (or housing) 220 by way of linkage 110. Linkage 110 is a linkage which constrains the motion of the armature 226 to be along a reference axis which is parallel to axis 216 and which has a substantially fixed orientation with respect to support member 220.

The linkage 110 generally has the form shown in the incorporated reference U.S. patent application Ser. No. 265,089. FIG. 1 of that application shows the linkage 110.

Linkage 110 is adapted for constraining the motion of a reference member 112 (corresponding to armature 226) to be along an axis 116 (corresponding to an axis parallel to axis 216), where that first reference axis 116 is fixed with respect to a support member 220. The linkage 110 includes a pair of elongated flexure members 124 and 126. The flexure members 124 and 126, as shown, are beams with flexures (indicated by reference designations 125 and 127, respectively) positioned at one end. The flexure 125 and 127 at the ends of each of members 124 and 126 are coupled by respective one of beam portions 124a and 126a to the support member 220.

The other end of each of members 124 and 126 is coupled by means of an adjustable coupling assembly to the support member 220. The adjustable coupling assembly for member 124 includes a screw 130 near the free end of member 124, and an associated threaded hole in an extension portion 132 of support member 220. The motion of that end of flexure 124 is opposed by a spring 134. With this configuration, the screw 130 may be turned to adjustably position the free end of flexure member 124 in the direction of axis 116.

In a similar manner, the adjustable coupling assembly for member 126 includes a screw 131 near the free end of member 126, an associated threaded hole in extension portion 132, and a spring 135. Screw 131 may be turned to adjustably position the free end of flexure member 126 in the direction of axis 116.

The linkage 110 further includes two V-shaped flexure elements 136 and 138, with each of elements 136 and 138 including a vertex end (including a flexure, or hinge) and two distal end portions (each including a flexure, or hinge). The vertex portions of the flexure elements 136 and 138 are coupled (by extension beam portions 136a and 138a beyond the vertex flexure) to the ends of the reference member 112, at points B and C, respectively, where points B and C are separated by distance X in the direction of axis 116.

The first and second distal ends of element 136 are connected at coupling points A and D, respectively, by way of extension beam portions 136b and 136c, respectively (beyond the distal end flexures) and a respective one of spacer elements 142 and 143 to the one of flexure elements 124 and 126 at points between the flexures and free ends of those members. Points A and D lie along axis 140 which is nominally parallel perpendicular to the axis 116. In the preferred form, points A and D are on the order of one-tenth of the distance from the flexure to the free end of the respective elements 124 and 126.

The first and second distal end portions of the V-shaped element 138 are coupled to the support member 220 (by extension beam portions 138b and 138c, respectively, beyond the distal end flexures) with their respective flexures positioned at points E and F, respectively.

Points E and F lie on a third reference axis 144 which is perpendicular to axis 116.

When axis 140 is parallel to axis 144, and separated therefrom by distance X in the direction of axis 116, the motion of reference member 112 is constrained to be substantially along the axis 116. Moreover, the member 112 is substantially resistant to moments about axis 116.

The linkage 110 is particularly easy to adjust so that axes 140 and 144 are parallel. Generally, the screws 130 and 131 may be adjustably positioned to achieve a "fine tuning" or precise control of this motion. The position of the junction of the end of members 136 and 138 along flexure elements 124 and 126 may be selectived to provide a vernier control of the trueness of this motion.

In the illustrated form of the invention, the distance between points A and B equals the distance between points D and B, and the distance between points F and C equals the distance between points E and C. These relationships permit the maximum range of motion of member 112 along axis 116, although other relationships may also be used.

With the configuration disclosed for linkage 110, the two adjustment screws 130 and 131 permit full alignment, or "fine tuning" of the linkage to optimize the motion of armature 226. This linkage 110 is particularly resistant to moments applied by off-center loading in any direction of an object to be weighed in pan 212.

In the illustrated embodiment, elements 124, 126, 134 and 136 are relatively rigid beams with flexures at discrete locations. In alternate embodiments, these elements may be replaced with elements having a distributed flexure, for example, spring steel.

FORCE TRANSDUCER 10

The force transducer 10 is coupled between the armature 226 and the support member 220. In the illustrated embodiment, force transducer 10 is a capacitance type sensor, generally of the form shown in FIG. 1 of the incorporated reference U.S. Ser. No. 265,087 (SET-114).

As shown there, force transducer 10 includes a pair of rectangular cross-section, elongated members 12 and 14, extending along a common central axis 16. Elongated member 12 is shown also in FIG. 2. Members 12 and 14 include complementary faces at their adjacent ends. As shown, the entire end portions of members 12 and 14 form the complementary faces, although in other embodiments, the complementary faces may be only a portion of the adjacent ends.

In the illustrated embodiment, the faces of members 12 and 14 include planar portions 20 and 22, respectively, which are offset in the direction of a first reference axis 30, which axis is perpendicular to central axis 16. The planar portions 20 and 22 are parallel to a second reference axis 24, which is perpendicular to axes 16 and 30. In the preferred embodiment, the planar portions 20 and 22 are also parallel to central axis 16, although in other embodiments, the planar portions may be angularly offset from axis 16. As shown, the faces on either side of faces 20 and 22 are parallel to axis 30 and perpendicular to axis 16, although other orientations of these faces might also be used. In the present embodiment, members 12 and 14 are substantially identical. These members are joined to form the transducer 10.

The elongated members 12 and 14 each include two planar slots extending from their complementary faces in planes parallel to the axes 16 and 24.

In the present embodiment, both slots in each of members 12 and 14 are of identical depth. However, in other embodiments, in each of members 12 and 14, one slot may have a depth A and the other slot may have a depth B, where at least one of A and B is non-zero and where the sum of A+B equals a predetermined value. Moreover, the two slots in member 12 are spaced apart in the direction of axis 30 so that the upper beam portion 12a and the lower beam portion 12b of member 12 (i.e. the beam portions bounded by the slots and outer surfaces of member 12) are relatively flexible in response to moments about axes parallel to the axis 24.

In the present embodiment, members 12 and 14 are substantially identical. As a result, the two slots of member 14 are considered to define "upper" beam portion 14a and "lower" beam portion 14b.

The planar portions 20 and 22 of members 12 and 14 each support one of substantially planar electrically conductive members 34 and 36.

The upper beam portion 12a and lower beam portion 14b of members 12 and 14, respectively, are joined by member 42 and the lower beam portion 12b and upper beam portion 14a of membes 12 and 14, respectively, are joined by member 44. In the resultant configuration, the complementary faces of members 12 and 14 are mutually offset in the direction of axis 16 and the opposed conductive surfaces of members 34 and 36 are mutually offset in the direction of axis 30. In the preferred form, the members 12 and 14 are quartz, and the adjoining members, 42 and 44, are also quartz so that the members may all be fused together to form a monolithic structure. In alternate embodiments, other materials, such as titanium silicate, ceramics or other dielectric materials may be used.

The transducer 10 also includes a rigid support member 50 rigidly attached to member 14 and a rigid input force member 52 rigidly attached to member 12. These members 50 and 52 may also be quartz and fused to the respective ones of blocks 12 and 14. The support member 50 is coupled to the upper planar surface of a transducer support element 56.

In operation of the transducer 10, a force-to-be-measured is applied substantially parallel to axis 216 by way of pan 212, post 214, linkage 160, armature 226, rigid coupling elements 227 and 229 to input member 52. That force is transmitted to the right hand (as illustrated in FIG. 3) portion of member 14. In response to the applied force applied to member 52, an equal and opposite force is applied to the lefthand (as illustrated in FIG. 3) portion of member 12 at upper surface 220a of support member 220a. In response to the force pair applied to the transducer 10, the upper and lower beam members of transducer 10 deform in a manner so that the conductive members 34 and 36 separate by a distance related to the magnitude of the force pair applied to the transducer 10, while maintaining their parallel relationship. The magnitude of the capacitance of the effective capacitor formed by members 34 and 36 may be measured conventionally, and provides a measure of the force applied to member 52.

Because the transducer 10 is highly resistant to moments and forces in directions other than along an axis parallel to axis 216, the applied force pair need not be precisely parallel to axis 216.

As the upper and lower beam members deform, there is stress in those members. In the illustrated embodiment, due to the symmetry of the system where the slot depths A and B are equal and blocks 12 and 14 are substantially similar, the junction formed by the joining members 42 and 44 occur at bending stress inflection points, i.e. where bending moments are zero. In other forms of the invention, for example, where the slot depths A and B differ and particularly where one of the slot depths A or B may equal zero, the junction of the elements does not occur at these stress inflection points. However, the preferred form has this characteristic. Under this condition, the junction formed by joining members 42 and 44 is lightly stressed and a relatively low quality, and thus inexpensive, junction may be used.

Where the invention is constructed from quartz, for example, the force transducer 10 is characterized by very low hysteresis and very low creep under load, with precision index on the order of $10^{-5}$ to $10^{-6}$. Moreover, the device is characterized by a relatively low thermally-induced changing capacitance.

The force transducer 10 generally responds only to net force along a single axis parallel to axis 216 and maintains a relatively high rejection ratio for forces in other planes. The elements 12 and 14 of the present embodiment may be readily constructed of a rectangular elongated quartz block which is cut to form the complementary surfaces. The two blocks having those complementary surfaces merely have a pair of slots cut to form the upper and lower beam portions. Those beam portions are joined, for example, by fusing, to form a rugged, monolithic structure. In other forms of the invention, other materials, including metals, may be used for members 12 and 14, provided at least one of members 34 and 36 is insulated from the other.

With this configuration for transducer 10, the capacitance across lines 10a (which are connected to conductive elements 34 and 36) is representative of the separation between those elements 34 and 36, which in turn varies with the force applied to the transducer.

POSITION SENSOR 244

Figure 4:
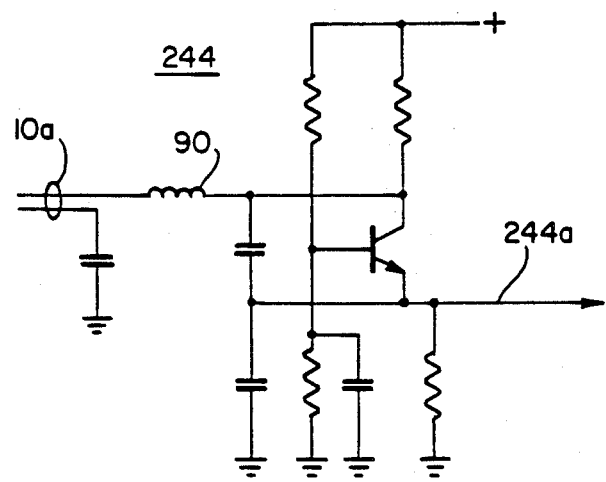
FIG. 4 shows in schematic form the position sensor of the system of FIG. 1.

The position sensor 244 in the present embodiment is shown in FIG. 4. Sensor 244 is coupled to lines 10a from force transducer 10. The capacitance associated with those terminals interacts with the circuit of sensor 244 to provide an oscillator. The oscillator provides a signal on line 244a characterized by a frequency related to the capacitance across lines 10a and the inductance of inductor 90, and thus the force applied to pan 212.

In the preferred form, inductor 90 is a high precision, stable inductive circuit element of the form shown in the figure of the incorporated reference U.S. patent application Ser. No. 265,090 (SET-119).

Figure 5:
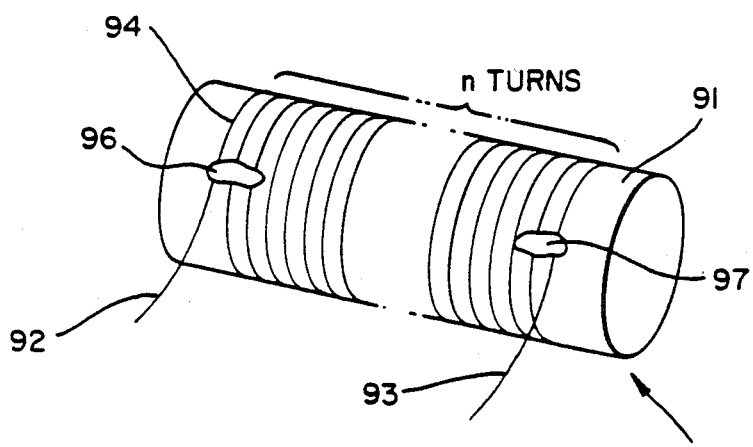
FIG. 5 shows one form for the inductor of the position sensor of FIG. 4.

FIG. 5 shows a preferred form for the inductor 90 of the circuit of FIG. 4. Inductor 90 includes a rigid, cylindrical dielectric support member 91. Support member 91 is a fused quartz rod having a circular crosssection and a diameter of 0.625 inches. A winding extends between two terminals 92 and 93. The winding includes forty turns on the rod 91. The turns are uniformly spaced with 12 mil inter-turn spacing.

The winding is made from a composite wire 94. Wire 94 in the present embodiment is 0.0071 inch diameter "Copperply" wire, manufactured by National Standard Corporation, Niles, Mich. This composite wire has a hardened steel core and a copper cladding on that core, when approximately 40% of the weight of the wire is copper. The tensile strength of the wire is on the order of 200,000 pounds per square inch.

In producing the element 90, the quartz rod 91 is mounted on a lathe and turned with the wire 94 being maintained at a tension on the order of 85% of the tensile strength of the wire. The windings are maintained under tension by cementing the ends of the windings on the rod 91. Elements 96 and 97 as shown in the Figure represent the cement at the ends of the winding. By way of example, the cement used may be a cyanoacrylate adhesive. Alternately, an epoxy adhesive could be used.

With this configuration at terminals 92 and 93, the element 90 provides a characteristic inductance on the order of 10 uh with a temperature variation of 2 ppm/degree Fahrenheit. In other embodiments, different composite wire structures may be used. For example, claddings may be made from silver, or gold, on a steel core, or some other high tensile strength material core. Also, the support member 91 may be some other material besides quartz, such as a ceramic, or titanium silicate. Similarly, alternate geometries of the support member may also be used, such as those having alliptical cross-sections, rather than circular cross-section rods. The support member may be solid or hollow.

With this configuration, the force transducer 10 and position sensor 244 form an oscillator which is characterized by high stability over temperature, providing an output signal on line 244a which varies in frequency with the force applied to the force transducer 10.

PROCESSOR 250

Figure 6:
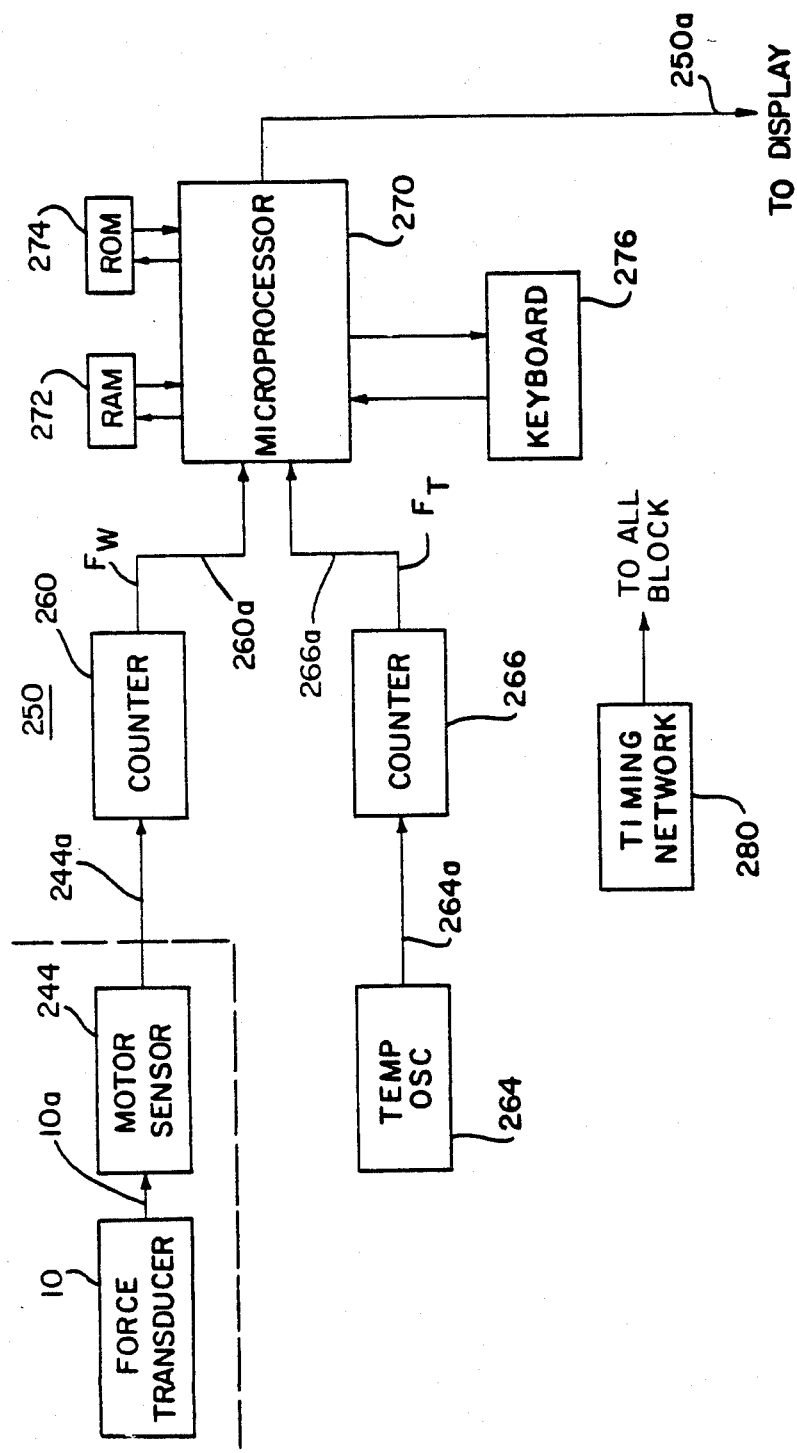
FIG. 6 shows in block diagram form, the processor of the system of FIG. 1.

FIG. 6 shows the processor 250 of system 210 in block diagram form. The processor 250 includes a first (or weight) oscillator which provides a signal on line 244a which has a frequency representative of the detected force applied by a weight on pan 212. The height oscillator includes the force transducer 10 and position sensor 244 as described in the incorporated reference. The signal on line 244a is coupled to a counter 260 which provides a digital count signal $F_W$ on line 260a ($F_W$), which are representative of the frequency of the signal on line 244a.

A temperature sensor 264 provides an oscillatory signal on line 264a in which the frequency of the signal on that line is representative of the temperature of the system 210. The signal on line 264a is coupled to a counter 266 which provides digital count signals ($F_T$) on line 266a which are representative of the frequency of the signal on line 264a. Lines 260a and 266a are applied to a microprocessor 270.

Microprocessor 270 includes an associated random access memory (RAM) 272 and a read only memory (ROM) 274, and an input/output keyboard 276. Microprocessor 270 also provides an output signal on line 250a suitable for driving a conventional display. A timing network 280 provides timing control signals to the blocks in processor 250. The microprocessor 270 and associated memory can also process the output signal, using known digital signal processing techniques, to attenuate the high frequency components of the signal. This signal processing capability is particularly useful where the coupling between the weighing pan and the armature is substantially rigid so that there is no mechanical filtering of the high frequency oscillations.

In one form of the invention, the microprocessor may be a Mostek type 38P70/02, ROM 274 is a Hitachi type HM462532, and a RAM 272 is an NCR type 2055.

In operation, the signals on line 244a and 264a are characterized by frequencies representative of the weight of an object on a pan and the temperature of system 210, respectively. The counters 260 and 266 are controlled by the timing network 280 in order to act as window counters providing digital counts representative of the frequencies of the signals on line 244a and 264a ($F_W$ and $F_T$).

The memory 272 stores constants $K_{ij}$ representative of a temperature-compensated force function W(F,T). The function W(F,T) is defined as $$W(F,T) = \sum_{i=1}^{m} a_i(T) F^{i-1} \quad (*)$$

where F is a function of the uncompensated force produced by an object and T is representative of the temperature of the weighing system 210. In this definition, $$a_i(T) = \sum_{j=1}^{n} K_{ij} T^{i-1} \quad i = 1, 2, \ldots, m \quad (**)$$

where $K_{ij}$ are constants. In the present embodiment, m=4 and n=3. The values $F_W$ and $F_T$ may be used in conjunction with a signal corresponding to function W(F,T) evaluated at an input force F corresponding to $F_W$ and at a temperature T corresponding to $F_T$ to provide a temperature-compensated value representative of the weight of an object on the pan 212.

The present embodiment may also be used in a calibration mode to generate and store data representative of force function (*) in memory 272. To perform this calibration procedure with the present embodiment, a succession of four known weights are deposited on the pan 212 at each of three temperatures. In other embodiments, different numbers of weights and temperatures may be used.

The processor 250 then in effect generates a set of twelve simultaneous equations based on W(F,T). Processor 250 solves these twelve simultaneous equations to provide signals representative of $a_1$ evaluated at temperatures $T_1$, $T_2$ and $T_3$, $a_2$ evaluated at temperatures $T_1$, $T_2$, and $T_3$, $a_3$ evaluated at $T_1$, $T_2$, and $T_3$, and $a_4$ evaluated at $T_1$, $T_2$, and $T_3$.

Processor 250 then uses these twelve resultant values for $a_i$ to solve a set of twelve simultaneous equations based on equations (**) for the twelve $K_{ij}$ values. Generally, the three values for $a_1$ at the temperatures $T_1$, $T_2$, and $T_3$, the values of $a_2$ at the three temperatures, the values for $a_3$ at the three temperatures and the values of $a_4$ at the three temperatures are used to determine $K_{ij}$ i=1, ... 4, j=1, ..., 3.

Following the determination of these values for $K_{ij}$, the function W(F,T) is fully specified. Data representative of these values is stored in RAM 272.

OPERATION

In a general calibration mode, processor 250 determines a "calibration surface" for the weighing system 210, where a weight value (W) is a function of the frequency of the oscillator of sensor 244 (F) for applied weights and the temperature of system 210 (T). This functional relationship W(F,T) describes the calibration surface for system 210. A succession of reference weights are placed on the weighing pan 212 at each of a number of temperatures. In response to the placement of the weights on the pan 212, the force on the pan from the weight are transferred to the force transducer 10, with the linkages 160 and 110, in the FIGS. 1 and 7 embodiments, and the parallelogram structure 150 in the FIG. 11 embodiment, minimizing the effect of moments applied about axis 216 (such as might arise from off-center loading of the weight). The forces applied to the transducer 10 causes relative movements of the conductive surfaces of that transducer, resulting in a capacitance changes. Those capacitance changes cause a corresponding changes in the output frequency of the oscillator on line 244a. The processor then utilizes those values in the manner described above to fully define W(F,T) and then stores data representative of this function in RAM 272.

In the weight measuring mode, in response to the placement of the weight-to-be-measured on the pan 212, the processor 250 utilizes those signals (on line 244a) in conjunction with the signal from the temperature oscillator 264 (on line 264a) to identify the value of the function W(F,T) at the corresponding values for F and T. That value of W(F,T) is converted to a signal representative of the weight on the pan 212 at the current temperature of the system 210.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A weighing system comprising:
   A. force input member for supporting an object-to-be-weighed,
   B. a rigid armature member,
   C. first linkage including means for coupling said armature and a reference member whereby said armature is constrained to motion substantially parallel to a reference axis, said reference axis being fixed with respect to said reference member,
   D. mechanical means for coupling said force input member and said armature,
   E. force transducer coupled between said armature and said reference member, said force transducer including a pair of complementary opposed surfaces having a mutual separation which is related to the force across said transducer, and
   F. a position sensor for generating a signal representative of the separation between said complementary opposed surfaces of said force transducer.

2. A system according to claim 1 wherein said mechanical coupling means comprises spring means.

3. A system according to claim 1 wherein said mechanical coupling means comprises a substantially rigid connection.

4. A system according to claim 1, wherein said mechanical coupling means comprises:
   A. spring means for resiliently coupling said force input member and said armature, and
   B. means for damping relative motion of said force input member with respect to said armature.

5. A system according to claim 4, wherein said spring means includes first spring means connected in parallel with said damping means and second spring means connected in series with said damping means to attenuate high frequency oscillations.

6. A system according to claims 1 or 5 further comprising overforce protection means that limits the maximum displacement of said force input member in response to a force applied to said force input member.

7. A system according to claim 6, wherein said overforce protection means comprises a stop member that is fixed with respect to said reference member that limits said maximum displacement of said force input member along said weighing axis.

8. A system according to claim 4 wherein said spring means includes a second linkage means with means to constrain said force input member to motion substantially along a weighing axis parallel to said reference axis.

9. A system according to claims 4 or 8 wherein said damper is a fluid damper and includes a pair of opposed elements having complementary opposing surfaces, one of said pair being coupled to said armature and the other of said pair being coupled to said force input member and being adapted for relative motion along said weighing axis, wherein said opposing surfaces include a plurality of alternating ridges and troughs, whereby fluid flow between said ridges and troughs resulting from said relative motion provides said damping.

10. A weighing system comprising:
A. force input member for supporting an object-to-be-weighed,
B. a rigid armature member,
C. first linkage including means for coupling said armature and a reference member whereby said armature is constrained to motion substantially parallel to a reference axis, said reference axis being fixed with respect to said reference member,
D. mechanical means for coupling said force input member and said armature, wherein said mechanical coupling means comprises:
a support member mounted on said armature,
means for damping relative motion of said force input member with respect to said armature, wherein said damping means is a fluid damper and includes a fluid chamber composed of opposing surfaces of said force input member and said support member, said fluid chamber being equipped with an orifice, whereby fluid flow into or out of said chamber through said orifice resulting from said relative motion provides said damping, and
spring means for resiliently coupling said force input member and said armature, said spring means comprising a resilient member located between said opposing surfaces,
E. force transducer coupled between said armature and said reference member, said force transducer including a pair of complementary opposed surfaces having a mutual separation which is related to the force across said transducer, and
F. a position sensor for generating a signal representative of the separation between said complementary opposed surfaces of said force transducer.

11. A system according to claim 10 wherein said resilient member comprises a closed loop of resilient material spanning the gap between said force input member and said support member thereby defining said fluid chamber.

12. A system according to claim 10 wherein said resilient means comprises a plurality of resilient supports deployed between said opposing surfaces.

13. A system according to claim 1 wherein said first linear motion linkage includes an adjustable means for controlling the range of motion of said armature to be substantially along said reference axis.

14. A system according to claim 1 wherein said force transducer includes conductive elements on opposing portions of said opposed surfaces, and
wherein said position sensor includes an electrical circuit coupled to said conductive elements, whereby said conductive elements and said circuit form an oscillator having a characteristic frequency related to said separation of said complementary opposed surfaces.

15. A weighing system comprising:
A. force input member for supporting an object-to-be-weighed,
B. a rigid armature member,
C. first linkage including means for coupling said armature and a reference member whereby said armature is constrained to motion substantially parallel to a reference axis, said reference axis being fixed with respect to said reference member,
D. mechanical means for coupling said force input member and said armature, wherein said mechanical coupling means comprises a parallelogram linkage including a first vertical member attached to said force input member, a second vertical member attached to said armature, a pair of resilient members secured between said vertical members in a generally parallel, spaced relationship, and means connected between said force input member and said armature for damping their relative motion,
E. force transducer coupled between said armature and said reference member, said force transducer including a pair of complementary opposed surfaces having a mutual separation which is related to the force across said transducer, and
F. a position sensor for generating a signal representative of the separation between said complementary opposed surfaces of said force transducer.

16. A system according to claim 15 wherein said damping means comprises a pair of arms each secured at one end to opposite sides of said parallelogram structure and extending towards one another in a generally parallel, mutually spaced relationship, and an energy absorbing material located between said arms so that said relative motion flexes said material to produce said damping.

17. A system according to claim 16 wherein said arms are formed of a resilient material.

18. A system according to claims 16 or 17 wherein said arms extend generally along a diagonal of said parallelogram linkage.

19. A system according to claim 18 wherein said arms are each secured at one end to one of said first and second vertical members.

* * * * *